(12) United States Patent
Shultz (10) Patent No.: US 8,276,701 B2
(45) Date of Patent: *Oct. 2, 2012

(54) OMNI-DIRECTIONAL CONTIGUOUS MOVING SURFACE

(76) Inventor: Jonathan D. Shultz, Huntsville, AL (US)

(*) Notice: Subject to any disclaimer, the term of this patent is extended or adjusted under 35 U.S.C. 154(b) by 255 days.

This patent is subject to a terminal disclaimer.

(21) Appl. No.: 12/686,826

(22) Filed: Jan. 13, 2010

(65) Prior Publication Data

US 2010/0147430 A1      Jun. 17, 2010

Related U.S. Application Data

(62) Division of application No. 11/947,577, filed on Nov. 29, 2007, now Pat. No. 7,878,284.

(51) Int. Cl.
*B62D 57/00* (2006.01)
*A63B 22/02* (2006.01)

(52) U.S. Cl. ....... 180/199; 180/7.1; 180/9.1; 180/65.51; 305/52; 482/54

(58) Field of Classification Search .................. 180/6.5, 180/6.7, 7.1, 7.2, 9.1, 9.42, 10, 20, 65.51, 180/199, 200, 202; 280/28.5; 301/5.1, 5.23, 301/6.5; 305/34, 52, 157, 158; 482/51, 54
See application file for complete search history.

(56) References Cited

U.S. PATENT DOCUMENTS

| 3,465,843 A * | 9/1969 | Guinot | 180/447 |
|---|---|---|---|
| 3,548,965 A * | 12/1970 | Pierro | 180/65.51 |
| 5,186,270 A * | 2/1993 | West | 180/6.62 |
| 5,562,572 A * | 10/1996 | Carmein | 482/4 |
| 6,123,647 A * | 9/2000 | Mitchell | 482/54 |
| 6,152,854 A * | 11/2000 | Carmein | 482/4 |
| 6,743,154 B2 * | 6/2004 | Epstein | 482/54 |
| 7,682,291 B2 * | 3/2010 | Gill et al. | 482/54 |
| 7,780,573 B1 * | 8/2010 | Carmein | 482/4 |
| 7,878,284 B1 * | 2/2011 | Shultz | 180/199 |
| 2005/0072616 A1 * | 4/2005 | Pal | 180/218 |
| 2007/0270285 A1 * | 11/2007 | Gill et al. | 482/54 |
| 2008/0018167 A1 * | 1/2008 | Fuji | 301/5.23 |

FOREIGN PATENT DOCUMENTS

| JP | 59109402 A * | 6/1984 |
|---|---|---|
| JP | 2007099248 A * | 4/2007 |
| WO | WO 2006068007 A1 * | 6/2006 |

\* cited by examiner

*Primary Examiner* — Paul N Dickson
*Assistant Examiner* — Wesley Potter
(74) *Attorney, Agent, or Firm* — David E. Mixon; Bradley Arant Boult Cummings LLP

(57) ABSTRACT

An apparatus capable of omni-directional movement including a belt layer made of a plurality of interlocking flexible rings and a surface layer made of a laterally inelastic and longitudinally flexible material that surrounds the exterior of the belt layer. The device has a bladder located in the interior of the belt layer that provides structural support for the belt layer and surface layer and a hub that is in contact with the surface layer and is connected to an axle. Longitudinal motion occurs as the bladder, the belt layer, the surface layer, and the hub rotate together. Lateral motion occurs as the belt layer and the surface layer rotate around the bladder. Longitudinal motion is induced by a plurality of electromagnetic curvilinear motor drive rings that are located around the hub and are in contact with the surface layer.

4 Claims, 8 Drawing Sheets

OMNI-DIRECTIONAL CONTIGUOUS MOVING SURFACE

This application claims priority as a divisional application of U.S. patent application Ser. No. 11/947,577 entitled "OMNI-DIRECTIONAL TREAD AND CONTIGUOUS MOVING SURFACE" that was filed on Nov. 29, 2007.

FIELD OF THE INVENTION

The invention relates generally to propulsion mechanisms. More specifically, the invention relates to an omni-directional contiguous moving surface.

BACKGROUND ART

In general, wheeled and tracked vehicles are not designed to traverse the ground laterally. Wheeled vehicles typically cannot spin in place but can only turn in a circle. Tracked vehicles typically only possess the ability to rotate by using oppositely driven tracks to spin in place. This creates tremendous stress on the track and potentially causes damage to the underlying surface as well. Consequently, a need exists for an apparatus that provides wheeled and tracked vehicles with omni-directional and holonomic movement by possessing the ability turn, slide, pivot, and spin in any direction.

SUMMARY OF THE INVENTION

In some aspects, the invention relates to an apparatus that is capable of omni-directional movement, comprising: a belt layer comprising a plurality of interlocking flexible rings; a surface layer comprising a laterally inelastic and longitudinally flexible material that surrounds the exterior of the belt layer, where the interior the surface layer is connected to the belt layer; a bladder located in the interior of the belt layer, where the bladder provides structural support for the belt layer and surface layer; a hub that is in contact with the surface layer and is connected to an axle; where longitudinal motion occurs as the bladder, the belt layer, the surface layer, and the hub rotate together, and where lateral motion occurs as the belt layer and the surface layer rotate around the bladder; and where the longitudinal motion is induced by a plurality of electromagnetic curvilinear motor drive rings located around the hub and in contact with the surface layer.

In other aspects, the invention relates to an apparatus that is capable of omni-directional movement, comprising: a belt layer comprising a plurality of interlocking flexible belts formed to allow a prescribed amount of longitudinal degree of freedom while restricting the rotational degree of freedom completely, where the belts are interlocked with a series of barriers and slots that allow the transfer of torque between the belts; a hub that is in contact with the belt layer and is connected to an axle; and where longitudinal motion occurs as the belt layer and the hub rotate together, and where lateral motion occurs as the belt layer rotates within the hub.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

The present invention is an omni-directional tire/hub combination. It allows a vehicle to move smoothly in either a longitudinal or lateral direction. Combinations of longitudinal and lateral velocity allow travel in any direction. The present invention is a solid-surface omni-directional wheel and broadens the usefulness of omni-directional vehicles (ODV) immensely. The invention is not restricted to a circular shape and can be fitted to tracked vehicles as well. Complex surface shapes can be accommodated due to the inherent flexibility of the structure. It can also be used as an infinite surface when formed in the shape of a treadmill. In the ODT 60 embodiment, the invention will have a solid uninterrupted surface on which the user can travel. The ODT application will be much lighter than current technology due to the simplicity of form and materials. Since the scope of this invention is large, several categories of transportation embodiments of the invention are disclosed. These generally fall into three broad categories: omni-directional wheels (ODW) 10; omni-directional tracks (ODTR) 50; and omni-directional treadmill (ODT) 60.

Figure 1:
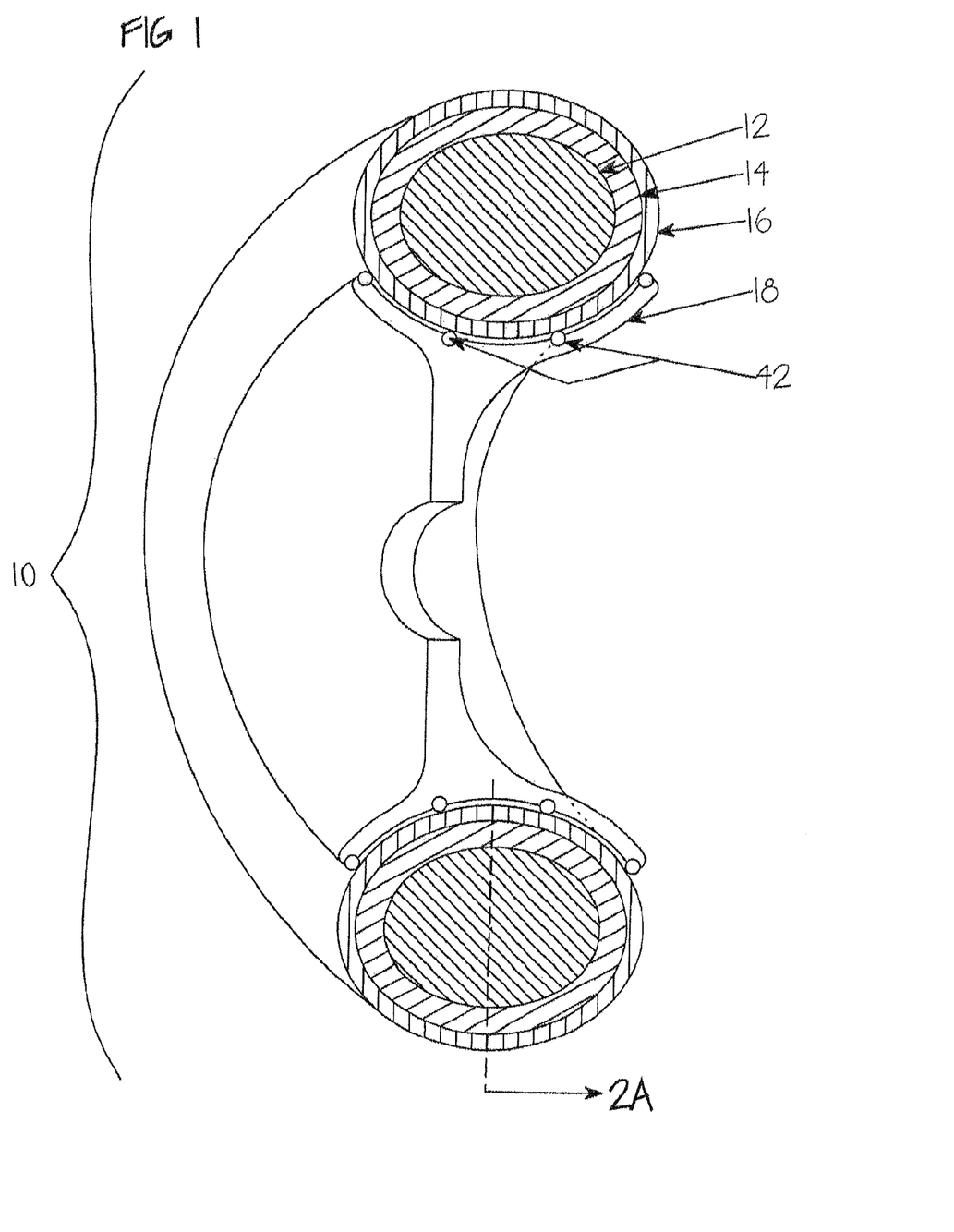
FIG. 1 shows a cross-sectional view of the wheel component of one embodiment of the present invention

FIG. 1 is a cross section view of one example of the omni-directional wheel (ODW) 10 embodiment of the present invention. The various layers and components of the invention are shown and include: an inner 'bladder' 12; a middle 'belt layer' 14; and the outer 'surface' layer 16. Longitudinal motion occurs via an axle which is connected to a hub 18. The bladder, belt, and surface layers (BBS) move longitudinally with the hub as it rotates with the axle. Lateral motion occurs as the belt and surface layers rotate laterally around the bladder. The surface layer and belt layer move laterally while the bladder and the hub remain relatively stationary. Lateral motion of the belt and surface may be eased by incorporating roller rings 42.

The function of the bladder 12 is to interact with the hub to contain the belt layer 14 and surface layer 16 on the hub. Without the bladder 12, a lateral force experienced by the surface layer 16 would result in the surface 16 and belt layers 14 rolling laterally off the hub 18. In FIG. 1, the interior radius of the bladder 12 is shown to be smaller than the maximum radius of the hub 18. Since the bladder 12 is formed of an inelastic material, the smaller radius bladder 12 will ensure the surface 16 and belt layers 14 tightly wrapped around the bladder 12 will not roll off the hub 18 when a lateral force is encountered. The bladder 12 may be formed of a rigid polymer but other materials that permit elastic deformation are acceptable. It can be either inflated with a gas or filled with a polymer/resin which exhibits the characteristics of an air-filled vessel but also retains the properties of a low friction solid. The bladder 12 may also be a connected sequence of rings having roller bearings of appropriate sizes spaced incrementally around the ring. These roller rings 42 would be connected together in a rigid structure 44 that forms the shape over which the belt layer 14 will rotate with or without roller rings. This embodiment would enable certain applications that are more prone to debris penetration of the ODW.

Figures 2A, 2B:
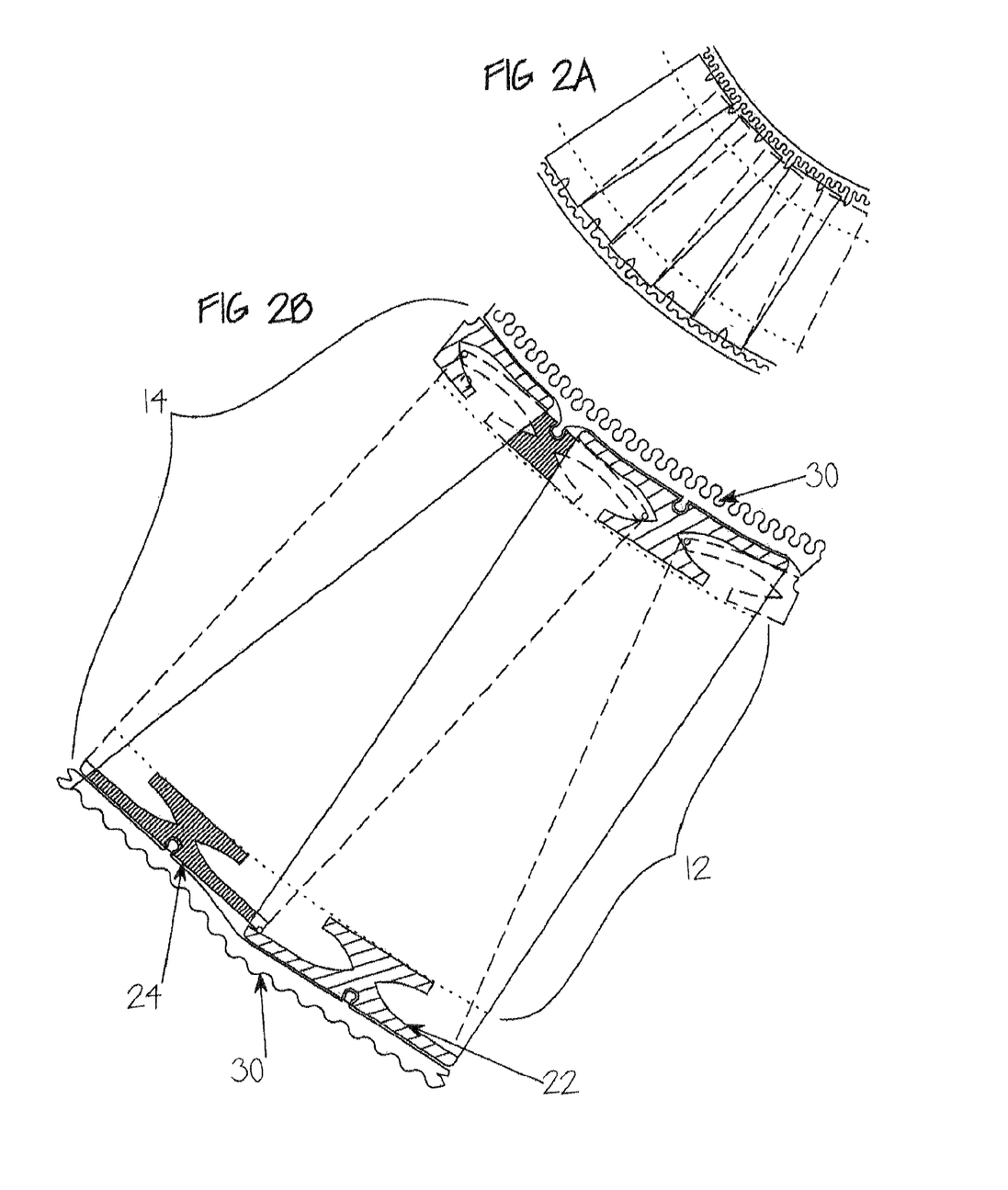
FIG. 2a shows a perspective view of one embodiment of a complete set of belts which together form the belt layer in the present invention.
FIG. 2b shows a more detailed view of an embodiment of two belts in the "belt" layer of the present invention.

FIGS. 2a and 2b show examples of the 'belt' layer. As shown in FIG. 2a, the belt layer 14 is composed of interlocking belts which are longitudinally flexible, but inelastic in both directions. The material similar to that used in a fan belt for a car is one form that would be suitable for the belts. Two slightly different belts alternate to create the structure on which the 'surface' layer rests. Belt 1 22 is identical in shape and material composition to Belt 2 24, but is slightly larger to allow Belt 2 24 to slide under the lip of Belt 1 22. The interior radius of both belts is identical. In FIG. 2b, one embodiment of the 'belt' layer 26 is shown as it would be formed for some applications using a standard wheel shape. The belts 28 can be connected physically with any mechanism which allows a specified axial degree of freedom such as an angled rod in a slot or an interlocking belt surface where the edge of Belt 1 would contain a downward lip and the edge of Belt 2 would have an upward lip (similar to the interlocking lips shown in FIG. 7.

The base of both belts may be coated with a very low friction polymer which will slide over the bladder 12 reducing the torque required for lateral motion. If a wheeled ring bladder 40 (shown in FIG. 3A) embodiment is used, the base of the belts could either be high friction to maintain rolling over the bladder or cogged with the wheels on the bladder rings having matching cogs to ensure constant and consistent interaction between the layers. In some embodiments, no interlocking or connection of the belts will be required as the 'surface' layer 16 will serve the purpose of maintaining the integrity of the structure. In other embodiments, the belts could be made of a metal composite such as spring steel. The belts do not have to be linearly contiguous and can have shapes cut out of the surface to reduce weight and resolve heat dissipation concerns. This would create a 'belt' layer 14 that is perforated. When this type of 'belt' layer 14 is combined with the option of physically interlocking the belts instead of using the 'surface' layer 16, an alternative embodiment that may be used with large earth-moving vehicles is realized. Additional tread can be rigidly attached to the Belt 1 components to increase traction on a non-solid substrate. This embodiment would be ideally suited with the roller ring bladder 40 similar to the way a tank tread operates.

The 'surface' layer 16 interacts with the ground or other substrate as required by the specific embodiment. The 'surface' layer 16 also provides a contiguous omni-directional moving surface. The potential embodiments of this layer are numerous. First, this layer is optional since the ODW will function in most applications without it. Second, the 'surface' must be made of a material which exhibits the property of elastic deformation on the order of 25-200% elongation depending on the form of the structure. The inelastic surface layer 30 embodiment compensates for elasticity with flexibility. The shape of this type of surface layer 30 flexes longitudinally to cover the belt layer 14. The factor of expansion required is determined by the ratio of the minimum interior radius to the maximum exterior radius. For non-wheel shapes, the number of belts in the 'belt' layer can be increased or decreased to optimize the elastic deformation of the 'surface' layer. For an ODT, the option exists to have a fully elongated, a fully contracted, or partially elongated 'surface' layer. The 'surface' layer can be made of fabric as well where the fabric exhibits the elastic deformation property required by the shape. The 'surface' could also be a metal mesh for large earth moving vehicles. This surface would look more like a tank tread instead of a tire.

Figure 3A:
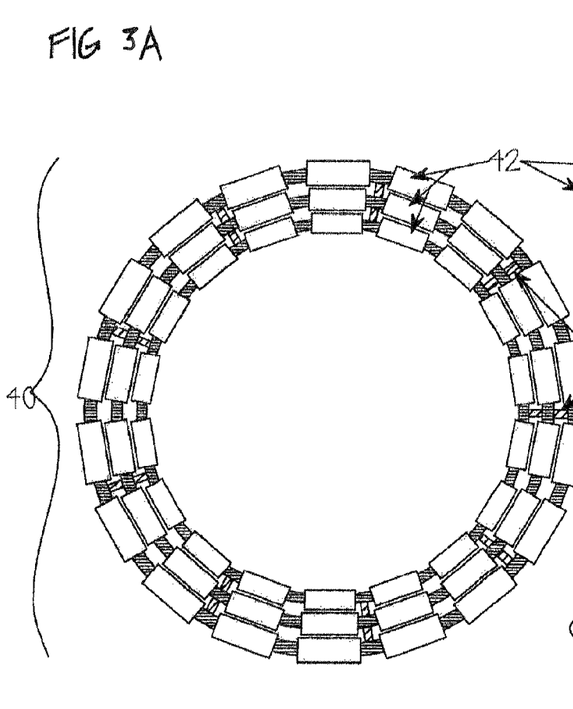
FIG. 3 shows one embodiment of the surface layer which in some applications may be attached to the exterior of the belt layer of the present invention.
Figure 3B:
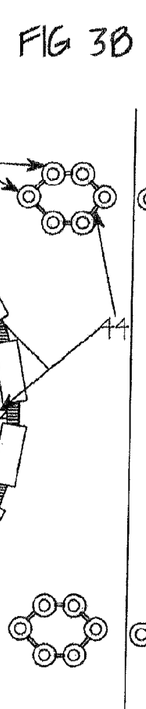
Figure 3C:
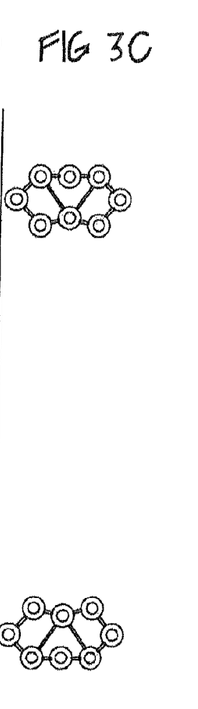

FIGS. 3A, 3B, and 3C show an embodiment of the roller ring bladder 40. Each roller ring 42 is connected to the others via the support structure 44 which ensures the rings fit tightly inside the belt layer 14. Many embodiments of roller rings 42 are envisioned. Some of these include: rings with aligned constant radius rollers (shown in FIG. 3A); rings with a spring coiled around the outside where adjacent loops of the spring are attached such that the loops move laterally together (as shown in FIG. 3B); and rings with "spurs" that increase the friction between the support ring and the surface layer (as shown in FIG. 3C). For tracked vehicles or applications that do not require a surface layer that is contiguous, the roller rings 42 could contain gears which would interact with cogs placed in the belt layer 14. Additional rigidity to the structure can be introduced in this fashion.

Figure 4:
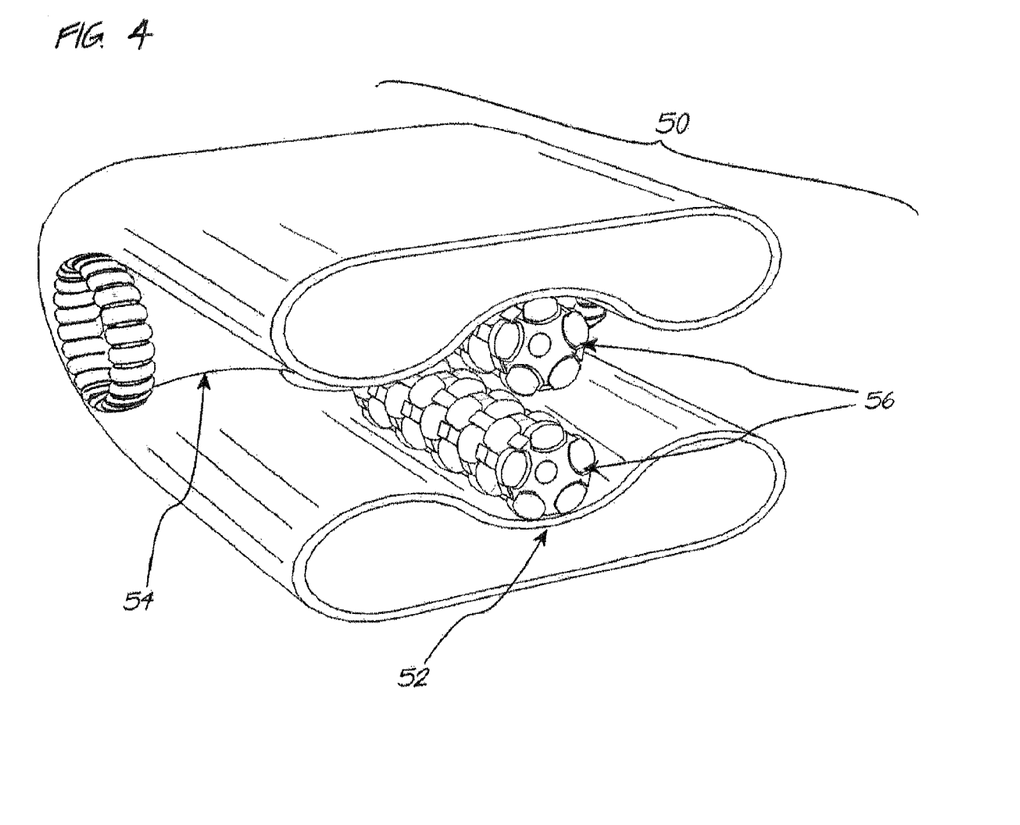
FIG. 4 shows one embodiment of the bladder as a set of roller rings for the present invention.

FIG. 4 is a depiction of the invention when used as an ODTR 50 for a tracked vehicle. This embodiment provides tracked vehicles with omni-directional and holonomic movement by allowing the vehicle the ability to turn, slide, pivot, and spin in any direction. The bulge 52 in the center of the track allows the longitudinal drive shaft 54 and lateral drive shaft 56 to be emplaced. These transparent drive shafts are connected to separate controllers to independently govern the velocity in the longitudinal and lateral directions. The rollers on the transparent drive shafts 54, 56 are what allow perpendicular motion.

Figure 5:
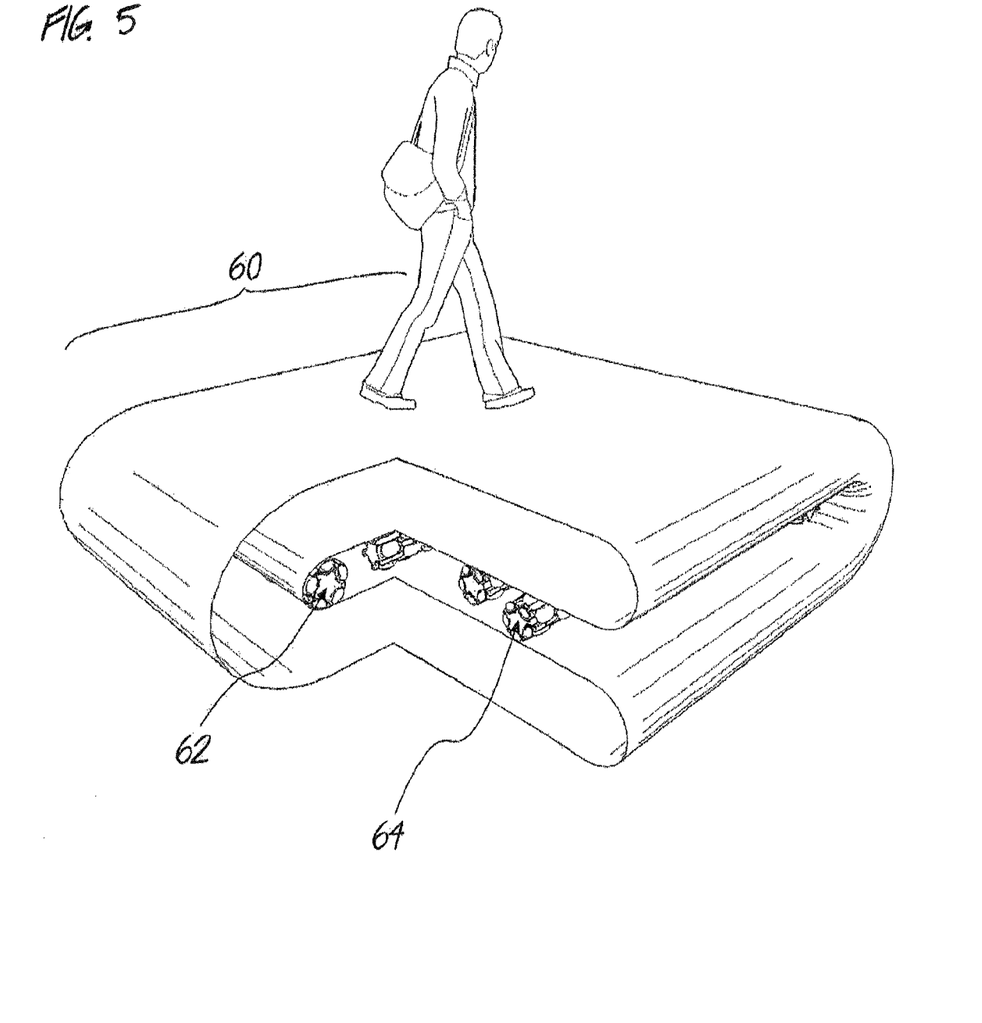
FIG. 5 shows one embodiment of the present invention when used as a track for a tracked vehicle.

FIG. 5 shows one embodiment of the invention as an ODT 60. In the embodiment shown, the hub is longitudinally and laterally expanded into the shape of a treadmill. The longitudinal drive shafts 62 and lateral drive shafts 64 seen in the interior allow the surface and belt layers to move freely perpendicular to the driving direction. Drive shafts placed perpendicular to each other simultaneously drive and allow resultant motion in any direction. As with the ODW, several embodiments of ODT have also been envisioned. One key advantage of the embodiments shown is the use of a solid surface of this invention and the mechanical interactions envisioned. The form and flexibility of this invention also add benefit and increases the scope of application.

Figure 6A:
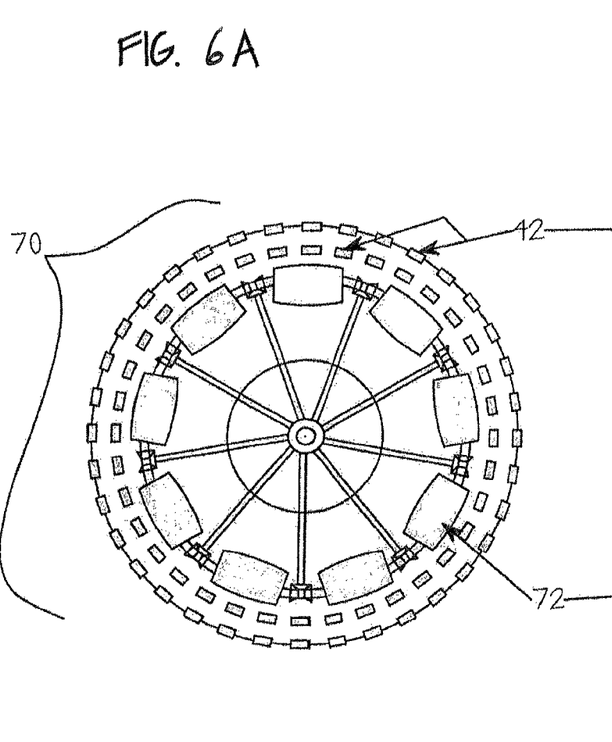
FIG. 6 shows one embodiment of the omni-directional treadmill (ODT) form of the present invention.
Figure 6B:
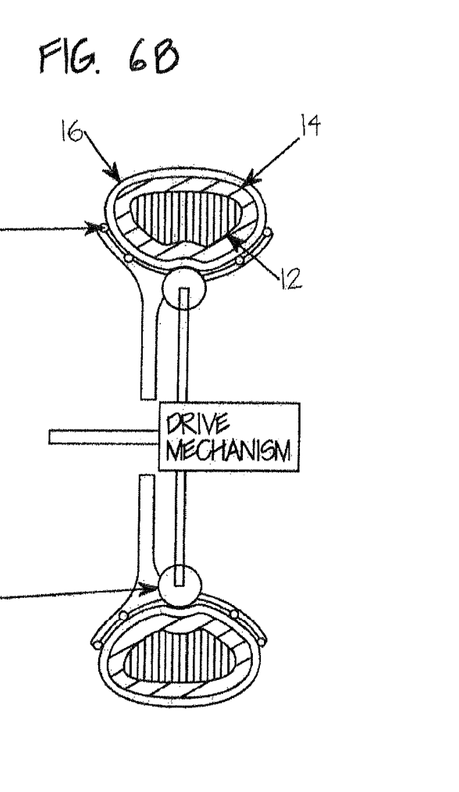

FIGS. 6A and 6B show one embodiment of drive mechanism 70 for the ODW 10 form of the present invention that includes the hub 18 and a lateral drive ring 72. Additional roller rings 42 are not shown in this depiction. A roller ring 42 is only shown on the rear edge of the hub 18 to indicate that a low friction surface on the hub 18 is a feasible embodiment. The mechanism 70 shown in FIG. 6A fits in the center of the belt layer 12 depicted in FIGS. 2a and 2b.

Figure 9:
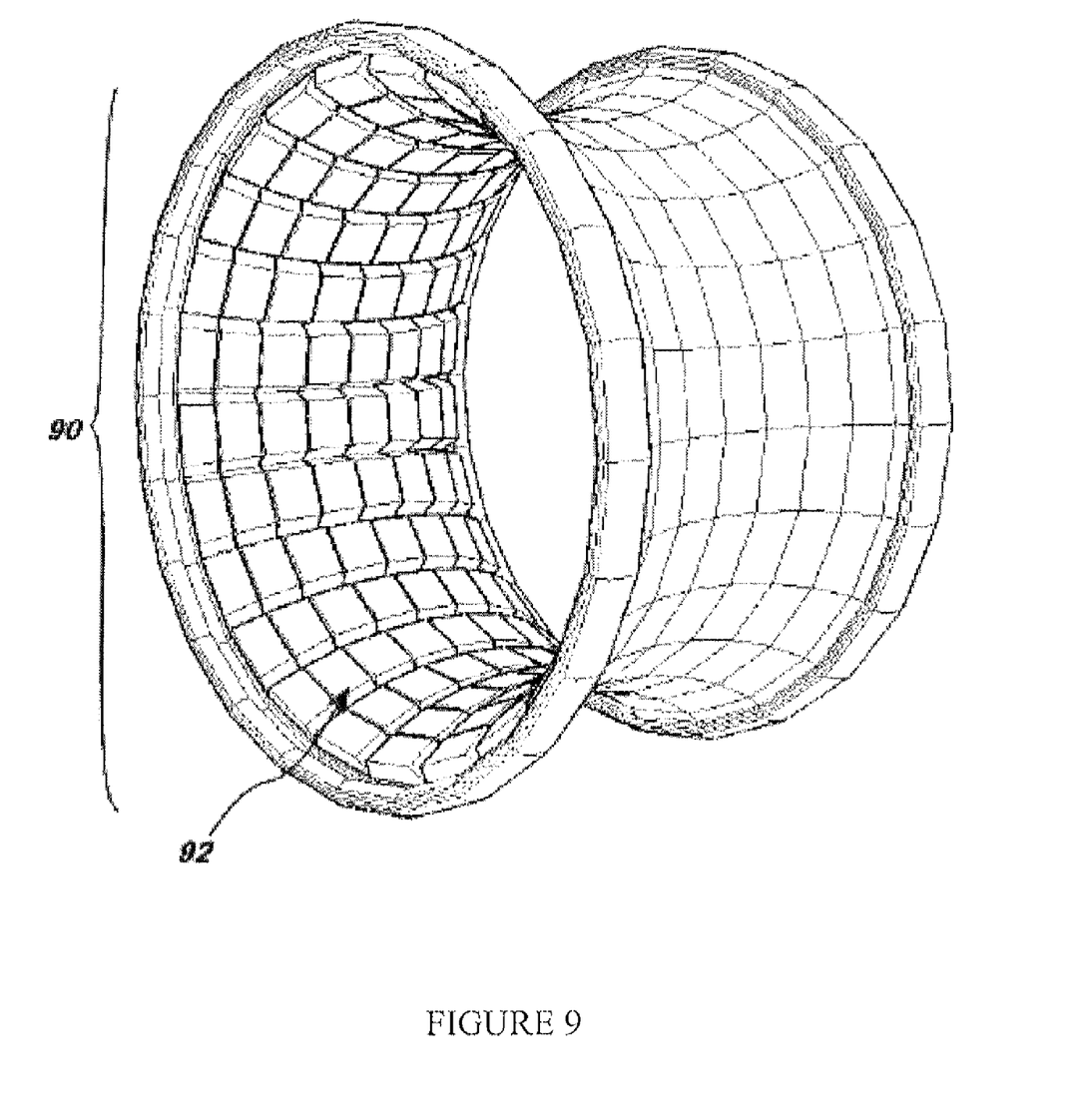
FIG. 9 shows one embodiment of an electromagnetic curvilinear motor comprising one propulsion method for the present invention.

Electromagnetic (EM) propulsion for the transparent drive mechanism is another potential embodiment for a drive mechanism. In this case, instead of drive shafts 62 or lateral drive rings 72, the driving force would be provided by a plurality of linear motors, or an electromagnetic curvilinear motor (EMCM) 90 controlled by a set of redundant control computers. The belt layer 14 and/or surface layer 16 would be impregnated with a magnetically reactive material to transfer the EM force from the EMCM 90 to the surface of the treadmill. The magnetically reactive material will be arranged within the belt layer 14 or surface layer 16 such that patterns of EM force emitted from the elemental EM motors 92 move the entire surface. With this embodiment of drive mechanism, the bladder would be formed of a material which provides magnetic shielding properties. This allows the EMCM 90 to provide more powerful driving force and not have the portion of the impregnated belt layer 14 and/or surface layer 16 currently away from the hub react to the EM force. If this were not the case, the force on the section of belt away from the hub 18 would subtract from the overall force generated on the belt layer 14 and/or surface layer 16. The EMCM 90 can be used in all driven embodiments of the invention regardless of shape and provides significant mechanical simplification of the overall invention.

As the ODW 10 encounters longitudinal and lateral force, the hub 18 is used to keep the ODW 10 in place relative to the vehicle or object which is being moved. The hub 18 will generally have a radius that fits securely inside the center of the surface layer 18. This allows room for additional components to be placed inside the hub 18 as required by the specific use including but not limited to a braking system, lateral drive transmission components, and accelerometers for advanced vehicle handling options.

Figure 7:
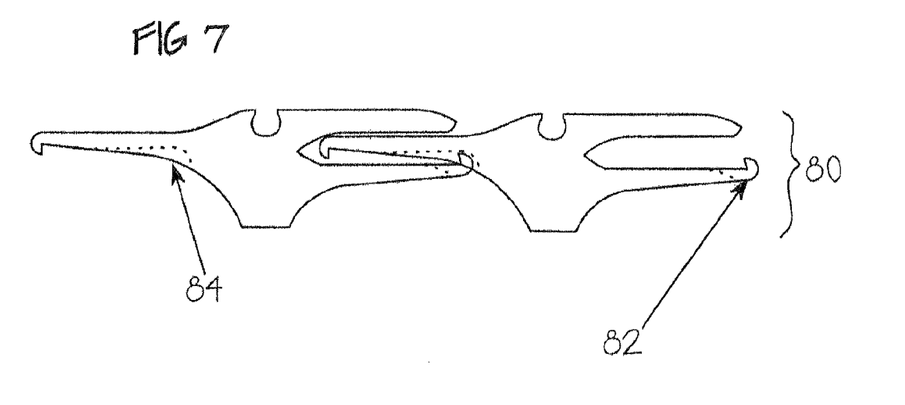
FIG. 7 shows one embodiment of drive mechanism for the wheel component of the present invention.
Figure 8A:
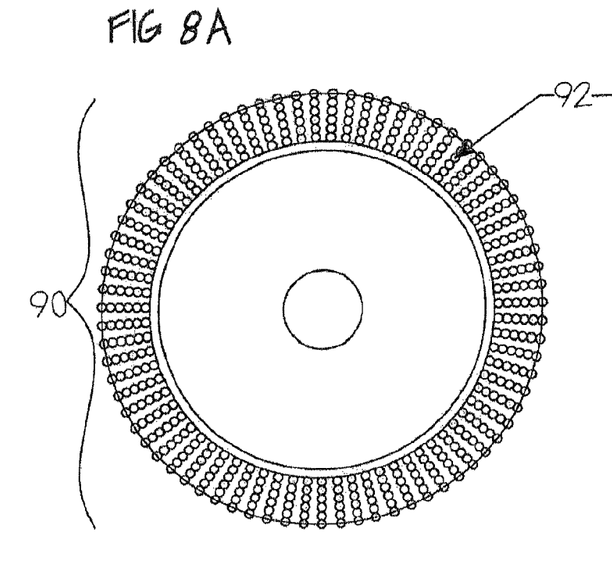
FIG. 8 shows a cross-sectional view of the interlocking belt of one embodiment of the present invention.
Figure 8B:
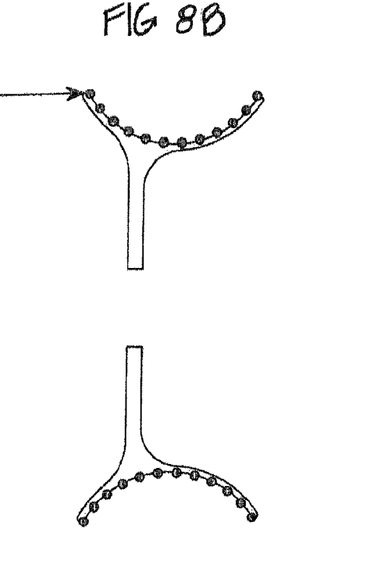

The present invention can be simplified by eliminating the surface layer and bladder. In this embodiment, the belts would be circular and contain the ability to interlock without assistance from the surface layer as it is not present. FIG. 7 is one example for the shape of this belt 80. The belt 80 needs to interlock while still allowing some longitudinal freedom of motion and restrict rotational motion completely. A barrier 82 and slot 84 will keep two adjacent belts aligned such that torque on one will be transferred to the other.

Some potential applications of the present invention apply but are not limited to the following industries: wheelchairs, large earthmoving equipment, lawn and garden tractors/lawnmowers, the trucking industry, trailers, recreational vehicles, the automotive industry at large, robotics, military/tracked vehicles, space exploration rovers, flight line tugs (for aircraft or cargo), weapons loaders, mining/drilling operations, snow removal vehicle, snow grooming machines, forklifts, replacement for caster wheels in all applications, sports medicine, physical therapy, virtual reality simulation platform, military combat simulator for an infantryman, and a valet parking system.

It should be clear from the preceding disclosure, that the present invention includes the advantage of providing wheeled and tracked vehicles with an omni-directional wheel/tread that allows for movement in both latitudinal and longitudinal directions. Additionally, the present invention includes an omni-directional wheel/tread that has a contiguous surface. Other examples of the invention include a treadmill surface that is able to move in both latitudinal and longitudinal directions.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. An apparatus that is capable of omni-directional movement, comprising:
    a belt layer comprising a plurality of interlocking flexible rings;
    a surface layer comprising a laterally inelastic and longitudinally flexible material that surrounds the exterior of the belt layer, where the interior of the surface layer is connected to the belt layer;
    a bladder located in the interior of the belt layer, where the bladder provides structural support for the belt layer and surface layer; and
    a hub that is in contact with the surface layer;
    where longitudinal motion occurs as the bladder, the belt layer, the surface layer, and the hub rotate together, and where lateral motion occurs as the belt layer and the surface layer rotate around the bladder; and
    where the lateral motion is induced by a plurality of electromagnetic curvilinear motor drive rings located around the hub and in contact with the surface layer.

2. The apparatus of claim 1, where the apparatus is generally shaped as a treadmill.

3. The apparatus of claim 1, where the apparatus is generally shaped as a track.

4. An apparatus that is capable of omni-directional movement, comprising:
    a belt layer comprising a plurality of interlocking flexible belts formed to allow a prescribed amount of longitudinal degree of freedom while restricting the rotational degree of freedom completely, where the belts are interlocked with a series of barriers and slots that allow the transfer of torque between the belts; and
    a hub that is in contact with the belt layer;
    where longitudinal motion, occurs as the belt layer and the hub rotate together, and where lateral motion occurs as the belt layer rotates within the hub.

\* \* \* \* \*